United States Patent
Ozeki

(10) Patent No.: US 11,823,075 B2
(45) Date of Patent: Nov. 21, 2023

(54) MACHINE LEARNING DEVICE, PREDICTION DEVICE, AND CONTROL DEVICE

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 570 days.

(21) Appl. No.: 16/876,822

(22) Filed: May 18, 2020

(65) Prior Publication Data

US 2020/0394536 A1 Dec. 17, 2020

(30) Foreign Application Priority Data

Jun. 11, 2019 (JP) ................................. 2019-108679

(51) Int. Cl.
*G06N 20/00* (2019.01)
*G06N 5/04* (2023.01)
*B29C 45/76* (2006.01)

(52) U.S. Cl.
CPC ............... *G06N 5/04* (2013.01); *B29C 45/76* (2013.01); *B29C 45/7626* (2013.01); *G06N 20/00* (2019.01)

(58) Field of Classification Search
None
See application file for complete search history.

(56) References Cited

U.S. PATENT DOCUMENTS

| 2008/0305202 A1* | 12/2008 | Oomori | B29C 45/76 |
| | | | 425/169 |
| 2019/0049939 A1* | 2/2019 | Kato | G05B 23/0205 |
| 2020/0101649 A1* | 4/2020 | Okubo | G05B 19/406 |

(Continued)

FOREIGN PATENT DOCUMENTS

| JP | 5-309711 | 11/1993 |
| JP | 2001-300979 | 10/2001 |
| JP | 2007-83602 | 4/2007 |

(Continued)

OTHER PUBLICATIONS

Office Action dated Aug. 5, 2022 in related U.S. Appl. No. 16/883,054.

*Primary Examiner* — Xuyang Xia

(74) *Attorney, Agent, or Firm* — Wenderoth, Lind & Ponack, L.L.P.

(57) ABSTRACT

Predicting a state of a mold after molding upon injection molding. A machine learning device includes: an input data acquiring unit that acquires input data including any molding condition including at least a type of resin, a type of additive, a blending ratio of the additive, and a temperature of the resin in molding any article molded by any injection molding machine, and state information indicating a wear amount of a mold before molding at the molding conditions; a label acquiring unit that acquires label data indicating state information of the mold after molding at the molding conditions included in the input data; and a learning unit that executes supervised learning using the input data acquired by the input data acquiring unit and the label data acquired by the label acquiring unit, and generates a learned model.

6 Claims, 6 Drawing Sheets

(56) References Cited

U.S. PATENT DOCUMENTS

2021/0004693 A1   1/2021   Joglekar et al.

FOREIGN PATENT DOCUMENTS

| JP | 2008-110486 | 5/2008 | | |
|----|----|----|----|----|
| JP | 2014-237751 | 12/2014 | | |
| JP | 2017174236 A | * 9/2017 | ....... | G05B 19/41875 |
| JP | 2018-167424 | 11/2018 | | |

* cited by examiner

MACHINE LEARNING DEVICE, PREDICTION DEVICE, AND CONTROL DEVICE

This application is based on and claims the benefit of priority from Japanese Patent Application No. 2019-108679, filed on 11 Jun. 2019, the content of which is incorporated herein by reference.

BACKGROUND OF THE INVENTION

Field of the Invention

The present invention relates to a machine learning device, a prediction device, and a control device.

Related Art

Resin products of plastic or the like (hereinafter, also referred to as "molded article") are, for example, molded by an injection molding device which injects the resin into a mold. The quality of the molded article varies depending on molding conditions such as the type and resin temperature of the resin as a material, the injection speed, and the injection pressure. Therefore, when molding an article to be molded, it is required to set the appropriate molding conditions in advance.

For example, a technique of setting appropriate molding conditions is known in which, using a neural network determined on the basis of a plurality of molding conditions used when a good product is acquired in a trial molding and the quality value of the good product, how the quality value changes is visually observed in accordance with changes to a plurality of molding conditions. For example, see Patent Document 1.

Patent Document 1: Japanese Unexamined Patent Application, Publication No. 2008-110486

SUMMARY OF THE INVENTION

However, the mold used for molding is worn by the friction with the molten resin as injection molding is repeatedly performed, and/or by corrosive gas or the like generated by the additive added to the resin. Thus, the dimensional accuracy and the surface accuracy of the molded article are lowered. In this case, by replacing the worn mold with a new mold, it is possible to recover the quality of the molded article such as the dimensional accuracy and the surface accuracy.

The timing of the replacement (life) of the mold is, for example, determined on the basis of shot count or the like; however, the state of the mold changes according to the molding conditions including the type of resin. For this reason, it is difficult to determine the timing for replacing the mold, and the operator is required to have some experience.

Therefore, it is desirable to predict the state of the mold after molding upon injection molding.

(1) According to an aspect of the present disclosure, a machine learning device includes: an input data acquiring unit that acquires input data including any molding condition including at least a type of resin, a type of additive, a blending ratio of the additive, and a temperature of the resin in molding any article molded by any injection molding machine, and state information indicating a wear amount of a mold before molding at the molding conditions; a label acquiring unit that acquires label data indicating state information of the mold after molding at the molding conditions included in the input data; and a learning unit that executes supervised learning using the input data acquired by the input data acquiring unit and the label data acquired by the label acquiring unit, and generates a learned model.

(2) According to an aspect of the present disclosure, a prediction device comprising: a learned model generated by a machine learning device according to (1); an input unit that inputs, prior to molding by an injection molding machine, a molding condition to be performed and state information of a current mold; and a prediction unit that inputs the molding condition to be performed and the state information of the current mold that are input by the input unit to the learned model, and predicts state information of the mold after molding at the molding condition to be performed.

(3) According to an aspect of the present disclosure, a control device includes a prediction device.

According to one aspect, it is possible to predict the state of the mold after molding upon injection molding.

DETAILED DESCRIPTION OF THE INVENTION

Hereinafter, a description will be given of an embodiment of the present disclosure with reference to the drawings.

Embodiment

Figure 1:
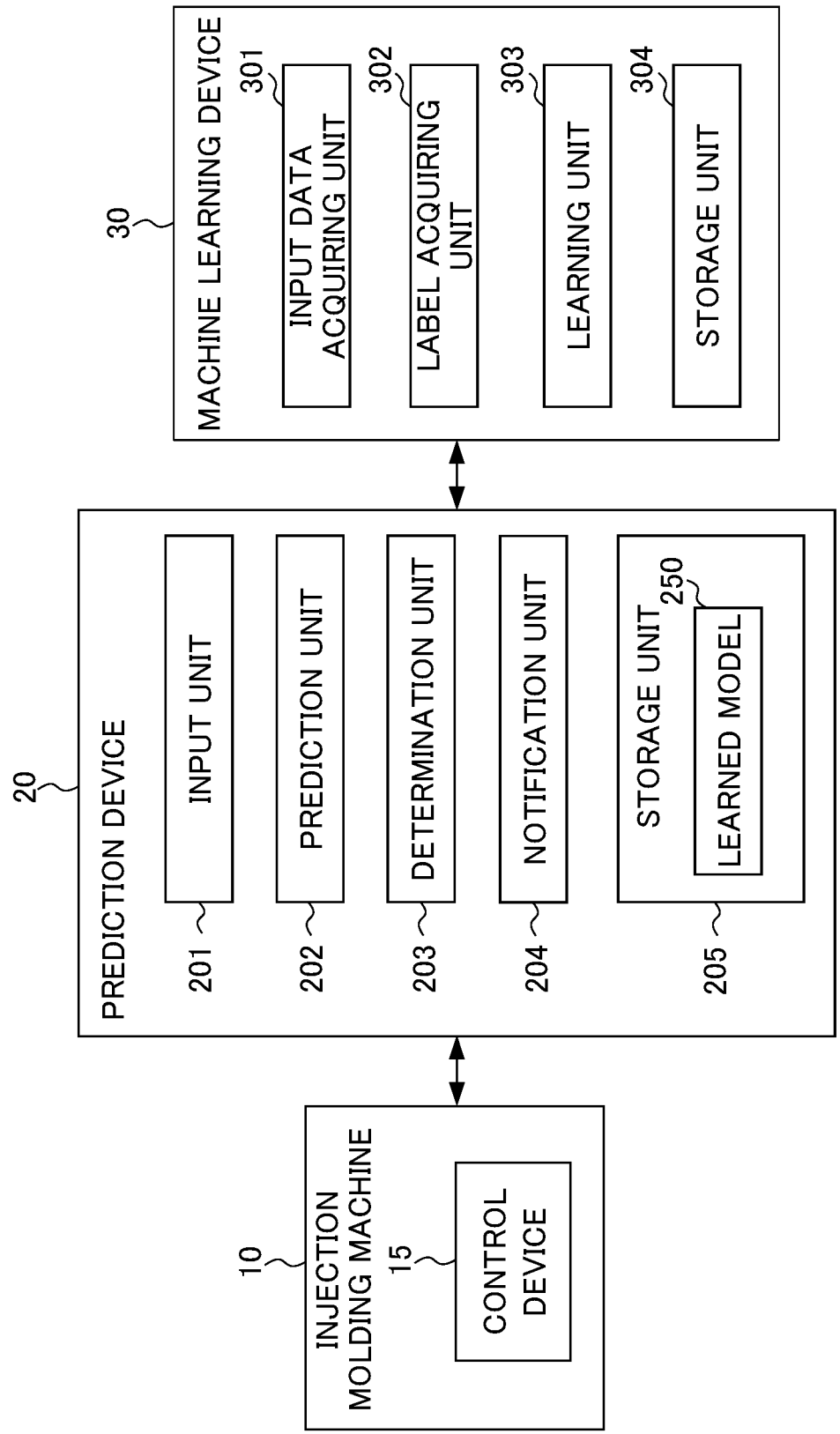
FIG. 1 is a functional block diagram showing a functional configuration example of an injection molding system according to an embodiment.

FIG. 1 is a functional block diagram showing a functional configuration example of an injection molding system according to an embodiment. As shown in FIG. 1, the injection molding system includes an injection molding machine 10, a prediction device 20, and a machine learning device 30.

The injection molding machine 10, the prediction device 20, and the machine learning device 30 may be directly connected to each other via a connection interface (not shown). Furthermore, the injection molding machine 10, the prediction device 20, and the machine learning device 30 may be connected to each other via a network (not shown) such as a LAN (Local Area Network) or the Internet. In this case, the injection molding machine 10, the prediction device 20, and the machine learning device 30 comprise a communication unit (not shown) for communicating with each other by such connections. As will be described later, the injection molding machine 10 may include the prediction device 20 and the machine learning device 30.

The injection molding machine 10 is an injection molding machine known to those skilled in the art and incorporates a control device 15. The injection molding machine 10 operates on the basis of an operation command of the control device 15. It should be noted that the control device 15 may be a device independent from the injection molding machine 10.

The control device 15 is a numerical control device known to those skilled in the art, generates an operation command on the basis of the control information, and transmits the generated operation command to the injection molding machine 10. Thus, the control device 15 controls the operation of the injection molding machine 10. Furthermore, the control device 15 may also output the control information to the prediction device 20 via a communication unit of the injection molding machine 10 (not shown). It should be noted that the control information includes a machining program and the values of parameters set to the control device 15.

In the operation phase, the prediction device 20 may acquire molding conditions to be performed included in the control information from the control device 15 prior to the injection molding by the injection molding machine 10. The prediction device 20 may also acquire the state information of the current mold installed in the injection molding machine 10 from the control device 15. The prediction device 20 can predict the state information of the mold after molding by inputting the acquired molding conditions to be performed and the state information of the current mold to the learned model provided from the machine learning device 30 to be described later.

It should be noted that the wear of the mold is mainly caused by the influence of the corrosive gas generated by additives added to the resin and the friction with the molten resin containing the additives such as glass fiber. Therefore, in order to consider the influence of the corrosive gas and the friction with the molten resin, the molding conditions include the type of resin (material) (thermosetting resin such as epoxy resin or polyurethane resin, thermoplastic resin such as polyester or polyvinyl chloride), the types of additives (glass fiber, stabilizer, coloring agent, etc.), the blending ratio of the additive, and the resin temperature. Furthermore, the molding conditions may include the temperature of the mold surface, the product of the holding pressure and the holding pressure time, the injection speed, the injection pressure, the injection amount, and the shot count thus far.

Furthermore, the state information includes the wear amount of the mold, as will be described later.

Before describing the prediction device 20, the "wear amount of the mold" and machine learning for generating a learned model will be described.

<Wear Amount of Mold>

As described above, the "wear amount of the mold" indicates the amount by which the mold installed in the injection molding machine 10 has worn down due to the corrosive gas generated by the additives added to the resin, and the friction with the molten resin blended with the additives such as glass fiber. The "wear amount of the mold" is a portion where the dimensional accuracy has deteriorated when checking the dimension of the molded article, and is calculated by the difference between the dimension of a molded article (the first piece, etc.) injection-molded for the first time after the replacement of the mold and the dimension of a molded article injection-molded after the first piece. That is, the dimensions of the molded articles for the first time of injection molding are identical to each other, and thus, the "wear amount of the mold" becomes "0%". Furthermore, the "wear amount of the mold" becomes a larger value as injection molding is repeated, and becomes "100%" in the allowable limit value of the dimension of the molded article (the allowable limit value of the wear amount).

It should be noted that the "wear amount of the mold" is indicated by a percentage value in the range of "0%" to "100%"; however, for example, the "wear amount of the mold" may be a value in the range of "0" to "1", etc.

<Machine Learning Device 30>

The machine learning device 30, for example, acquires in advance, as input data, any molding condition in injection molding by any injection molding machine, and state information including the wear amount of the mold before molding at the molding conditions.

Furthermore, the machine learning device 30 acquires the data indicating the wear amount of the mold after molding at the molding conditions in the acquired input data as a label (correct answer).

The machine learning device 30 performs supervised learning using training data which is a set of the label and the acquired input data, and constructs a learned model to be described later.

By doing so, the machine learning device 30 can provide the constructed learned model to the prediction device 20.

The machine learning device 30 will be described in detail.

The machine learning device 30 includes an input data acquiring unit 301, a label acquiring unit 302, a learning unit 303, and a storage unit 304, as shown in FIG. 1.

In the learning phase, the input data acquiring unit 301 acquires, as input data, the state information including any molding condition and the wear amount of the mold before molding at the molding conditions via a communication unit (not shown) from the control device 15 or the like. The input data acquiring unit 301 outputs the acquired input data to the storage unit 304.

The label acquiring unit 302 acquires the data indicating the wear amount of the mold after molding at the molding conditions in the input data as label data (correct answer data), and outputs the acquired label data to the storage unit 304.

The learning unit 303 receives the set of the above-described input data and the label as training data, and performs the supervised learning using the received training data to construct a learned model 250 that predicts the wear amount of the mold after molding on the basis of the molding conditions to be performed and the state information of the current wear amount of the mold.

Thereafter, the learning unit 303 provides the constructed learned model 250 to the prediction device 20.

It should be noted that it is preferable to prepare a number of pieces of training data for performing the supervised learning. For example, training data may be acquired from each of the control devices 15 of the injection molding machines 10 at various locations at which actually operating, such as at the customer's factory.

Figure 2:
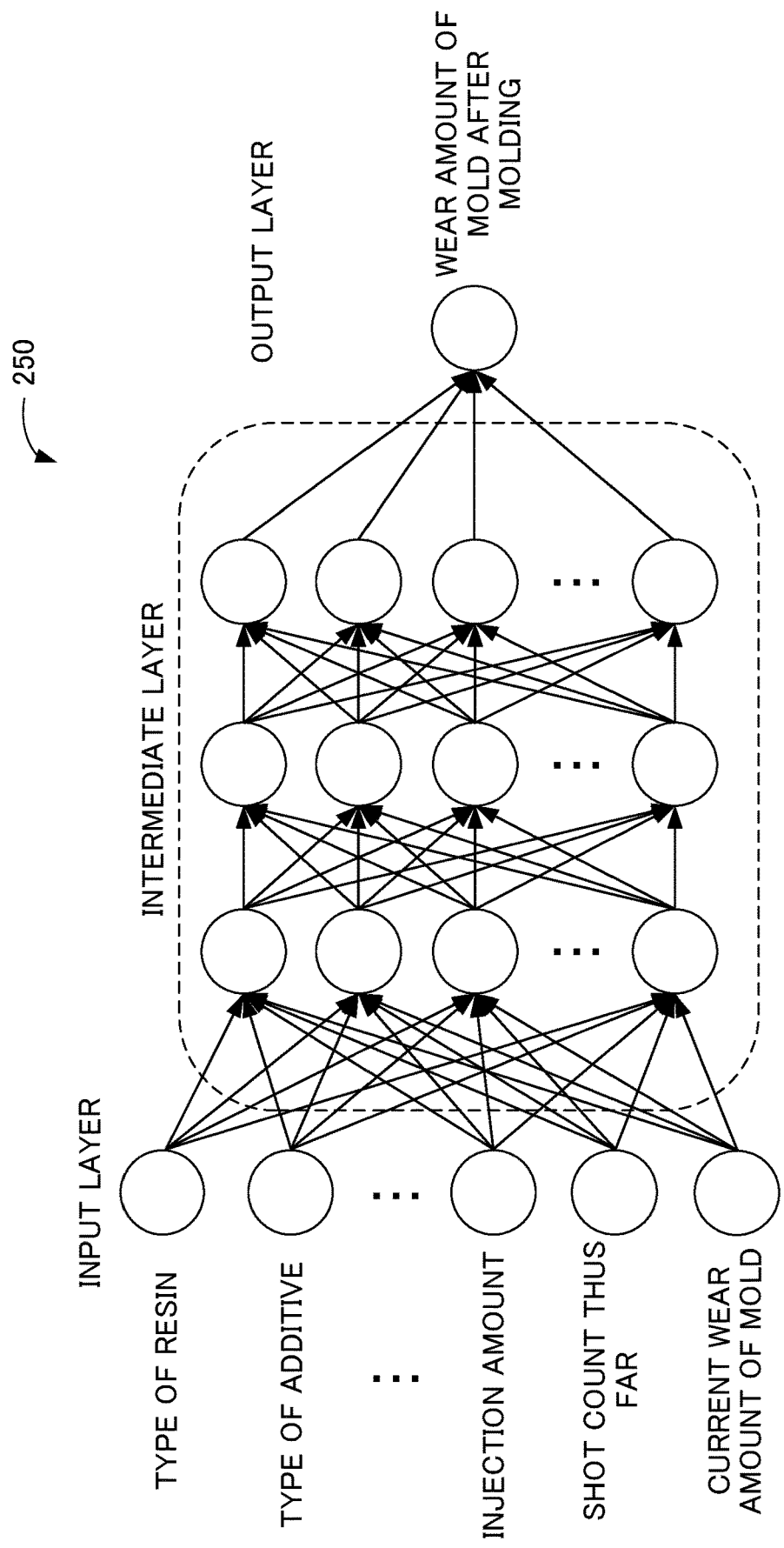
FIG. 2 a diagram showing an example of a learned model provided to a prediction device of FIG. 1.

FIG. 2 is a diagram showing an example of the learned model 250 provided to the prediction device 20 of FIG. 1. Here, as shown in FIG. 2, the learned model 250 exemplifies a multi-layer neural network in which the molding conditions to be performed such as the type of resin and the type of additive, and the state information of the current wear amount of the mold are used as the input layer, and the data indicating the "wear amount" of the mold after molding at the molding conditions are used as the output layer.

Here, the molding conditions to be performed include the type of resin (material) (thermosetting resin such as epoxy resin, thermoplastic resin such as polyester), the types of additives (glass fiber, stabilizer, coloring agent, etc.), the temperature of a mold surface, the product of the pressure holding and the pressure holding time, the resin temperature, the injection speed, the injection pressure, the injection amount, and the shot count thus far.

It should be noted that the molding conditions to be performed may include, for example, information of the mold (sprue, runner, gate, the size of the path of each portion such as a cavity (cross-sectional area size), volume, surface area, etc.) and information of the molded article (shape, dimensions, wall thickness, etc.). The information of the mold and the information of the molded article may be acquired, for example, from CAD (Computer-Aided Design) drawings or the like inputted to the control device 15.

Furthermore, in a case in which new training data are acquired after the learned model 250 is constructed, the learning unit 303 may update the learned model 250 that has been constructed by further performing the supervised learning for the learned model 250.

The supervised learning may be performed by online learning. Moreover, the supervised learning may be performed by batch learning. Furthermore, the supervised learning may be performed by mini-batch learning.

The online learning is a learning method in which injection molding by the injection molding machine 10 is performed and the supervised learning is performed instantaneously each time the training data are created. Furthermore, the batch learning is a learning method in which, while injection molding by the injection molding machine 10 is performed and the creation of the training data is repeated, a plurality of pieces of training data corresponding to the repetition is collected, and the supervised learning is performed using all the collected training data. Furthermore, the mini-batch learning is a learning method which is intermediate between the online learning and the batch learning and in which the supervised learning is performed whenever a certain amount of training data is collected.

The storage unit 304 is RAM (Random Access Memory) or the like, and stores input data acquired by the input data acquiring unit 301, the label data acquired by the label acquiring unit 302, and the learned model 250 constructed by the learning unit 303.

The machine learning for generating the learned model 250 included in the prediction device 20 has been described above.

Next, the prediction device 20 in an operation phase will be described.

<Prediction Device 20 in Operation Phase>

As shown in FIG. 1, the prediction device 20 in an operation phase includes an input unit 201, a prediction unit 202, a determination unit 203, a notification unit 204, and a storage unit 205.

It should be noted that the prediction device 20 includes an arithmetic processing unit (not shown) such as a central processing unit (CPU) in order to realize the operation of the functional blocks shown in FIG. 1. Moreover, the prediction device 20 includes an auxiliary storage device (not shown) such as read only memory (ROM) or an HDD storing various control programs, and a main storage device (not shown) such as RAM for storing data required temporarily for the arithmetic processing unit to execute the programs.

Furthermore, in the prediction device 20, the arithmetic processing device reads an OS or application software from the auxiliary storage device and develops the read OS and application software in the main storage device to perform arithmetic processing on the basis of the read OS or application software. The prediction device 20 controls hardware components on the basis of the arithmetic processing result. In this way, the processing of the functional blocks shown in FIG. 1 is realized. That is, the prediction device 20 can be realized by the cooperation of hardware and software.

Prior to the injection molding by the injection molding machine 10, the input unit 201 inputs the molding conditions to be performed and the state information of the current wear amount of the mold, for example, from the control information of control device 15. The input unit 201 outputs the acquired molding conditions to be performed and the state information of the current wear amount of the mold to the prediction unit 202.

The prediction unit 202 inputs the molding conditions to be performed and the state information of the current wear amount of the mold into the learned model 250 of FIG. 2 to predict the state information of the "wear amount" of the mold after molding.

The determination unit 203 determines whether to replace the mold on the basis of the state information of the wear amount of the mold after molding predicted by the prediction unit 202.

More specifically, the determination unit 203 determines the optimum time for replacing the mold on the basis of the comparison between the predicted value of the wear amount of the mold and a threshold value set in advance.

Figure 3:
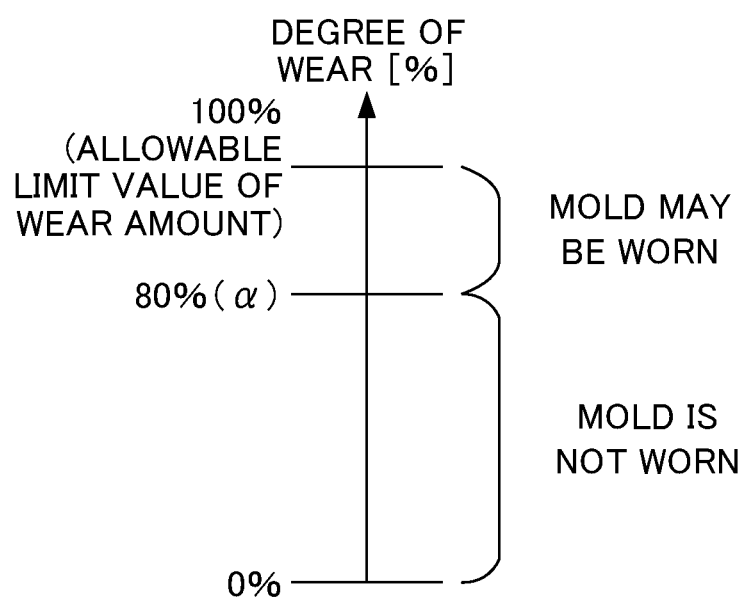
FIG. 3 is a diagram showing an example of the wear amount of a mold.

FIG. 3 is a diagram showing an example of the wear amount of the mold. As shown in FIG. 3, for example, the wear amount of the mold is "0%" as the initial value when a new mold, and the wear amount increases by being used repeatedly in the injection molding by the injection molding machine 10. For example, if the wear amount of the mold is in the range of "0%" to less than "80%", the mold functions properly. On the other hand, if the wear amount is "80%" or more, the mold does not function properly.

In the following description, the wear amount of "80%" is set as the threshold value $\alpha$. It should be noted that the threshold value $\alpha$ may be appropriately set in accordance with the environment or the like of the factory where the injection molding machine 10 is installed.

The determination unit 203 determines whether the wear amount of the mold predicted by the prediction unit 202 is smaller than the threshold value $\alpha$. In a case in which the predicted wear amount of the mold is smaller than the threshold value $\alpha$, the determination unit 203 determines not to replace the mold prior to the molding according to the molding conditions inputted by the input unit 201. On the other hand, in a case in which the predicted wear amount of the mold becomes the threshold value $\alpha$ or more, the determination unit 203 determines the period before molding at the molding conditions inputted, as the replacement timing of the mold.

The notification unit 204 may output an instruction for replacing the mold thus determined to an output device (not shown) such as a liquid crystal display included in the injection molding machine 10 and/or the control device 15.

In so doing, the notification unit 204 can recommend to the user (operator) the optimum time for replacing the mold determined by the determination unit 203. Moreover, the notification unit 204 may perform the notification via sound through a speaker (not shown).

The storage unit 205 is ROM, an HDD, or the like, and may store the learned model 250 together with various control programs.

<Prediction Processing of Prediction Device 20 in Operation Phase>

Next, operation related to prediction processing of the prediction device 20 according to the present embodiment will described.

Figure 4:
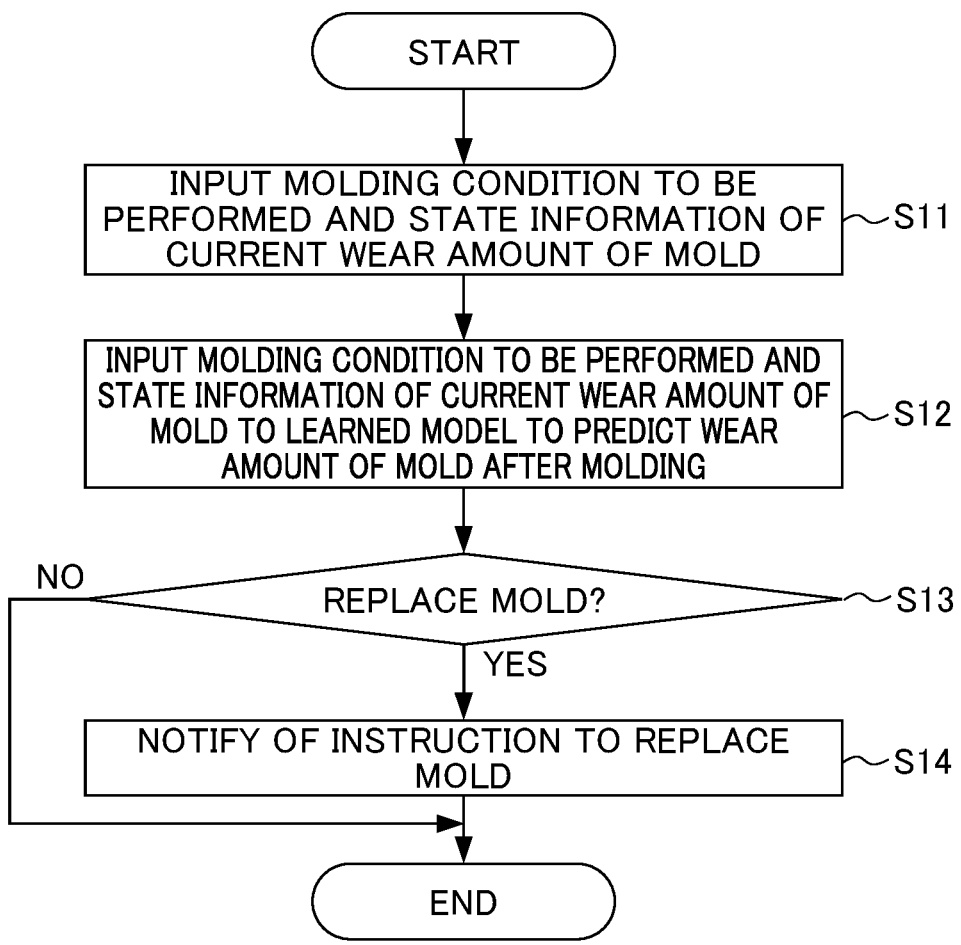
FIG. 4 is a flowchart for explaining prediction processing of the prediction device in an operation phase.

FIG. 4 is a flowchart describing the prediction processing of the prediction device 20 in an operation phase.

In Step S11, the input unit 201 inputs, prior to the injection molding by the injection molding machine 10, the molding conditions to be performed and the state information of the current wear amount of the mold from the control information of the control device 15.

In Step S12, the prediction unit 202 inputs the molding conditions to be performed and the state information of the wear amount of the mold, which are inputted in Step S11, into the learned model 250, and predicts the state information of the wear amount of the mold after molding.

In Step S13, the determination unit 203 determines whether to replace the mold before molding, on the basis of the comparison between the predicted value of the wear amount of the mold after molding predicted in Step S12 and the threshold value α. In a case in which it is determined that the mold is to be replaced, the processing advances to Step S14, and in a case in which it is determined that the mold is not to be replaced, the processing ends.

In Step S14, the notification unit 204 notifies of the instruction of the replacement of the mold determined in Step S13.

Thus, the prediction device 20 according to an embodiment inputs, prior to the injection molding by the injection molding machine 10, the molding conditions to be performed according to the molding, and the state information including the current wear amount of the mold to the learned model 250, and predicts the state information of the wear amount of the mold after molding. Then, the prediction device 20 can detect in advance whether or not the replacement of the mold is required during molding on the basis of the comparison between the predicted value of the wear amount of the mold after molding predicted and the threshold value.

That is, it is possible for the prediction device 20 to predict in advance how much the mold is worn in accordance with the number of times of the injection molding, and thus, it is possible to detect the period before molding at the molding conditions to be performed as the optimum timing for replacing the mold. Furthermore, the prediction device 20 can predict the wear amount of the mold of various shapes.

In addition, the injection molding system can reduce the production of defective products by replacing the mold because the period for replacing the mold (life) is known.

The prediction device 20 also uses the learned models 250 to eliminate the need for the operator to determine the need to replace the mold, thereby reducing the burden on the operator.

While an embodiment has been described above, the prediction device 20 and the machine learning device 30 are not limited to the above-described embodiment, and modifications, improvements, and the like can be made within a scope capable of achieving the object of the present invention.

Modification Example 1

In the above-described embodiment, the machine learning device 30 has been exemplified as a device that differs from the injection molding machine 10, the control device 15, and the prediction device 20. However, the injection molding machine 10, the control device 15, or the prediction device 20 may have some or all of the functions of the machine learning device 30.

Modification Example 2

For example, although in the above-described embodiment, the prediction device 20 is exemplified as a device that differs from the injection molding machine 10 or the control device 15, the injection molding machine 10 or the control device 15 may have some or all of the functions of the prediction device 20.

Alternatively, the server may include, for example, some or all of the input unit 201, the prediction unit 202, the determination unit 203, the notification unit 204, and the storage unit 205 of the prediction device 20. Moreover, the functions of the prediction device 20 may be realized using a virtual server function or the like on a cloud.

Furthermore, the prediction device 20 may be a distributed processing system in which the functions of the prediction device 20 are distributed appropriately to a plurality of servers.

Modification Example 3

Furthermore, for example, in the above embodiment, the molding conditions to be performed include the type of resin (material) (thermosetting resin such as epoxy resin, thermoplastic resin such as polyester), the types of additives (glass fiber, stabilizer, coloring agent, etc.), the temperature of the mold surface, the product of the pressure holding and pressure holding time, the resin temperature, the injection speed, the injection pressure, the injection amount, and the shot count thus far; however, the present invention is not limited thereto.

For example, the molding conditions to be performed may include information of the mold (sprue, runner, gate, the size of the path of each portion such as a cavity (cross-sectional area size), volume, surface area, etc.) and, information of the molded article (shape, dimensions, wall thickness, etc.). It should be noted that the information of the mold and the information of the molded article may be acquired, for example, from CAD drawings or the like inputted to the control device 15.

Modification Example 4

Furthermore, for example, in the above-described embodiment, the determination unit 203 of the prediction device 20 determines the timing for replacing the mold as the period before molding on the basis of the comparison between the predicted value of the wear amount of the mold after molding predicted, and the threshold value α.

For example, in a case of molding a plurality of molded articles on the basis of the molding conditions to be performed and the state information of the current wear amount of the mold, the determination unit 203 may adjust the number of molded articles (the shot count to be performed) so that the predicted value of the wear amount of the mold after molding the plurality of molded articles becomes smaller than the threshold value α.

More specifically, in a case in which the predicted value of the wear amount of the mold after molding becomes the threshold value α or more, the determination unit 203, for example, may be reduced, by a predetermined number, "the shot count to be performed (the number of moldings)" (by the instruction of the operator) by molding a plurality of molded articles with the molding conditions to be performed. The determination unit 203 can search the number k (k is an integer of 1 or more) of molded articles in which the predicted value of the wear amount is smaller than the threshold value α, by causing the prediction unit 202 to predict the wear amount of the mold after molding each time.

For example, in a case in which the predicted value of the wear amount of the mold after molding becomes the threshold value α or more when attempting to mold ten pieces of molded articles with the molding conditions to be performed, the determination unit 203 may reduce the number of molded articles from ten pieces by one (predetermined number), and may search for the number of molded articles such as eight pieces where the predicted value of the wear amount is smaller than the threshold value α.

Then, the determination unit 203, for example, determines the period after molding k-number of molded articles as the timing for replacing the mold. This allows the injection molding system of FIG. 1 to stop the injection molding machine 10 for replacing the mold at a convenient stage, which is the determined period.

This allows the injection molding system to predict in advance the timing for replacing the mold, i.e. the number of times of injection molding that will require the replacement of the mold before starting molding. Furthermore, the injection molding system can avoid the necessity to replace the mold during molding from occurring, and thus, it is possible to avoid the molding of a molded article in a state where the mold is worn.

Modification Example 5

Figure 5:
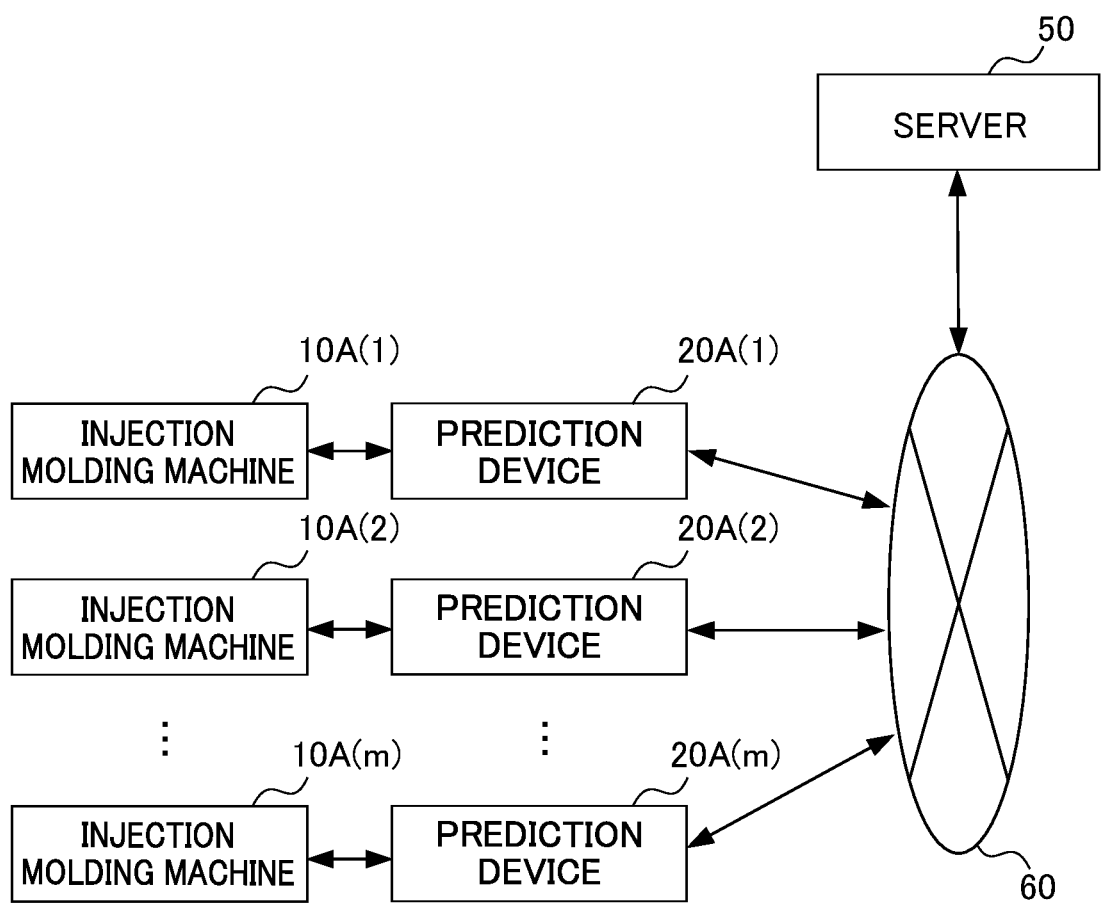
FIG. 5 is a diagram showing an example of a configuration of an injection molding system.

For example, in the above-described embodiment, the prediction device 20 uses the learned model 250 provided from the machine learning device 30 to predict the wear amount of the mold after molding at the molding conditions acquired from one injection molding machine 10; however, the present invention is not limited thereto. For example, as shown in FIG. 5, the server 50 may store the learned model 250 generated by the machine learning device 30, and may share the learned model 250 with m-number of prediction devices 20A(1) to 20A(m) connected to a network 60 (m is an integer of 2 or more). This allows the learned model 250 to be applied even when new injection molding machines and prediction devices are installed.

It should be noted that each of the prediction devices 20A(1) to 20A(m) is connected to a corresponding one of the injection molding machines 10A(1) to 10A(m).

Furthermore, each of the injection molding machines 10A(1) to 10A(m) corresponds to the injection molding machine 10 of FIG. 1. Each of the prediction devices 20A(1) to 20A(m) corresponds to the prediction device 20 of FIG. 1.

Figure 6:
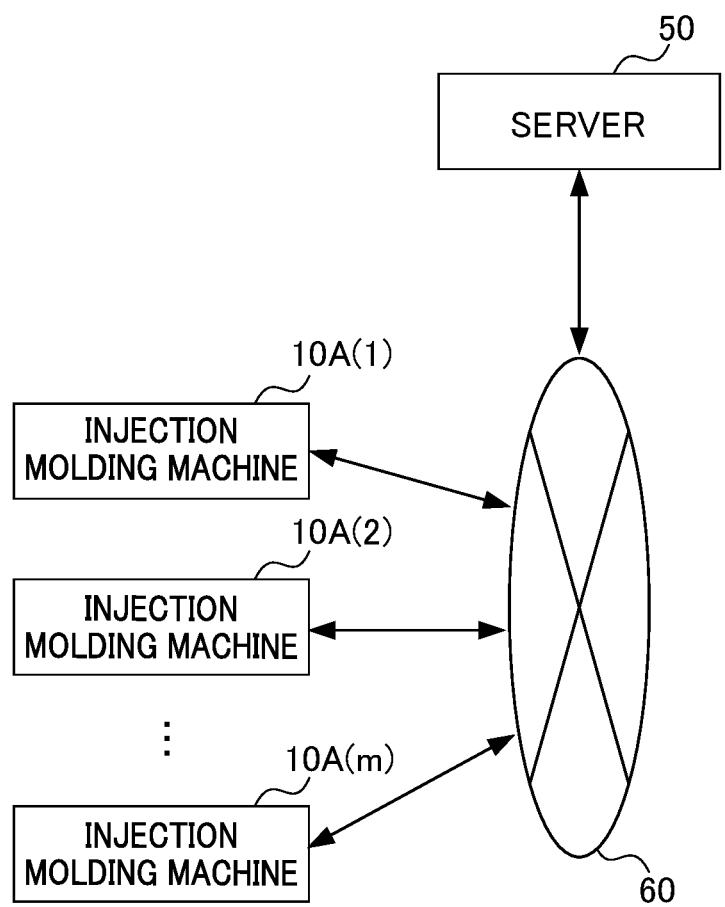
FIG. 6 is a diagram showing an example of a configuration of an injection molding system.

Alternatively, as shown in FIG. 6, the server 50, for example, may operate as the prediction device 20, and may predict the wear amount of the mold after molding at the molding conditions to be performed for each of the injection molding machines 10A(1) to 10A(m) connected to the network 60. This allows the learned model 250 to be applied even when new injection molding machines are deployed.

It should be noted that the functions included in the prediction device 20 and the machine learning device 30 of the embodiment may be realized by hardware, software, or a combination thereof. Here, being realized by software means being realized by a computer reading and executing programs.

Each component included in the prediction device 20 and the machine learning device 30 may be implemented by hardware including electronic circuits, software, or a combination thereof, or the like. If implemented by software, the programs that constitute this software are installed on the computer. These programs may also be recorded on removable media and distributed to the user, or downloaded to the user's computer over a network. Furthermore, when configured by hardware, a part or all of the functions of each component included in the above-described device can be constituted by an integrated circuit (IC) such as, for example, an ASIC (Application Specific integrated Circuit), a gate array, an FPGA (Field Programmable Gate Array), a CPLD (Complex Programmable Logic Device), or the like.

The programs can be stored on any of various types of non-transitory computer readable media and provided to a computer. The non-transitory computer readable media include various types of tangible storage media. Examples of non-temporary computer readable media include magnetic recording media (e.g., flexible disks, magnetic tapes, hard disk drives), magneto-optical media (e.g., magneto-optical disks), CD-ROM (Read Only Memory), CD-R, CD-R/W, semiconductor memory (e.g., mask ROM, PROM (Programmable ROM), EPROM (Erasable PROM), flash ROM, and RAM. In addition, the programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical cable, an optical fiber or the like, or a wireless communication path.

It should be noted that a step of writing programs to be recorded on a recording medium includes processing that is performed in a time series manner according to the order and processing that is performed in a parallel or independent manner even if the processing is not necessarily performed in a time series manner.

In other words, the machine learning device, the prediction device, and the control device of the present disclosure can have various embodiments having the following configurations.

(1) The machine learning device 30 of the present disclosure includes: an input data acquiring unit 301 that acquires input data including any molding condition including at least a type of resin, a type of additive, a blending ratio of the additive, and a temperature of the resin in molding any article molded by any injection molding machine 10, and state information indicating a wear amount of a mold before molding at the molding conditions; a label acquiring unit 302 that acquires label data indicating state information of the mold after molding at the molding conditions included in the input data; and a learning unit 303 that executes supervised learning using the input data acquired by the input data acquiring unit 301 and the label data acquired by the label acquiring unit 302, and generates a learned model 250.

According to the machine learning device 30, it is possible to generate the learned model 250 for predicting the wear amount of the mold after molding in consideration of the friction with the molten resin which contributes the most to the wear of the mold, and the influence from corrosive gas or the like generated by the additive added to the resin.

(2) The molding condition may include information relating to the mold and/or information relating to the molded article.

In so doing, the learned model 250 can be generated which can handle a specific mold or a specific molded article.

(3) The prediction device 20 of the present disclosure includes: a learned model 250 generated by a machine learning device 30 according to (1) or (2) above; an input unit 201 that inputs, prior to molding by an injection molding machine 10, a molding condition to be performed and state information of a current mold; and a prediction unit 202 that inputs the molding condition to be performed and the state information of the current mold that are input by the input unit 201 to the learned model 250, and predicts state information of the mold after molding at the molding condition to be performed.

According to the prediction device 20, it is possible to predict the wear amount of the mold after molding.

(4) It may be configured to further include a determination unit 203 that determines a period for replacing the mold on the basis of a comparison between a predicted value included in the state information of the mold predicted by the prediction unit 202 and a threshold value that is set in advance.

In so doing, the prediction device 20 can avoid the necessity to replace the mold during molding from occurring, and thus, it is possible to avoid molding the molded article in a state where the mold is worn.

(5) In a case of molding a plurality of articles molded on the basis of the molding condition to be performed and the state information of the current mold, the determination unit 203 may adjust a number of articles to be molded so that the predicted value after molding the plurality of articles becomes smaller than the threshold value.

In so doing, it is possible to predict in advance the timing for replacing the mold, i.e. the number of times of injection molding that will require the replacement of the mold before starting the injection molding, and thus, it is possible to schedule the replacement of the mold by stopping the injection molding machine 10 at a convenient stage of molding.

(6) The learned model 250 may be provided in a server 50 connected accessibly via a network 60 from the prediction device 20.

In so doing, the learned model 250 can be applied even when a new injection molding machine 10, a new control device 15, and a new prediction device 20 are installed.

(7) It may be configured to include a machine learning device 30.

By doing so, it is possible to obtain advantageous effects similar to those of any of the above (1) to (6).

(8) The control device 15 of the present disclosure may include a prediction device 20.

According to the control device 15, it is possible to obtain advantages similar to those of any of the above (1) to (7).

EXPLANATION OF REFERENCE NUMERALS 10 injection molding machine
15 control device
20 prediction device
201 input unit
202 prediction unit
203 determination unit
250 learned model
30 machine learning device
301 input data acquiring unit
302 label acquiring unit
303 learning unit
50 server

What is claimed is:

1. A machine learning system comprising
a machine learning device,
a prediction device, and a learned model generated by the machine learning device, wherein the machine learning device comprises:
a non-transitory computer-readable recording medium configured to store a program; and
a hardware processor configured to execute the program and control the machine learning device to:
acquire input data including any molding condition including at least a type of resin, a type of additive, a blending ratio of the additive, and a temperature of the resin in molding any article molded by any injection molding machine, and state information indicating a wear amount of a mold before molding at the molding conditions;
acquire label data indicating state information of the mold after molding at the molding conditions included in the input data; and
execute supervised learning using the input data acquired and the label data acquired, and generate the learned model to predict the wear amount of the mold after molding at the molding conditions acquired from any injection molding machine, and
wherein the prediction device comprises:
a non-transitory computer readable recording medium configured to store a program; and
a hardware processor configured to execute the program and control the prediction device to:
input, prior to molding by an injection molding machine, a molding condition to be performed and state information of a current mold; and
input the molding condition to be performed and the state information of the current mold that are input to the learned model, and predict state information of the mold after molding at the molding condition to be performed.

2. The machine learning system according to claim 1, wherein the molding condition includes information relating to the mold or information relating to the molded article.

3. The machine learning system according to claim 1, wherein, in the prediction device, the hardware processor is further configured to execute the program and control the prediction device to: determine a period for replacing the mold on a basis of a comparison between a predicted value included in the state information of the mold predicted and a threshold value that is set in advance.

4. The machine learning system according to claim 3, wherein, in the prediction device, in a case of molding a plurality of articles on the basis of the molding condition to be performed and the state information of the current mold, a number of articles to be molded are adjusted so that the predicted value after molding the plurality of articles becomes smaller than the threshold value.

5. The machine learning system according to claim 1, wherein, in prediction device, the learned model is provided in a server connected accessibly via a network from the prediction device.

6. A control device comprising
a machine learning device,
a prediction device, and a learned model generated by the machine learning device, wherein the machine learning device comprises:
a non-transitory computer-readable recording medium configured to store a program; and
a hardware processor configured to execute the program and control the machine learning device to:
acquire input data including any molding condition including at least a type of resin, a type of additive, a blending ratio of the additive, and a temperature of the resin in molding any article molded by any injection molding machine, and state information indicating a wear amount of a mold before molding at the molding conditions;

acquire label data indicating state information of the mold after molding at the molding conditions included in the input data; and execute supervised learning using the input data acquired and the label data acquired, and generate the learned model to predict the wear amount of the mold after molding at the molding conditions acquired from any injection molding machine, and wherein the prediction device comprises:

a non-transitory computer-readable recording medium configured to store a program; and a hardware processor configured to execute the program and control the prediction device to:

input, prior to molding by an injection molding machine, a molding condition to be performed and state information of a current mold; and input the molding condition to be performed and the state information of the current mold that are input to the learned model, and predict state information of the mold after molding at the molding condition to be performed.

* * * * *